(12) United States Patent
Fukui (10) Patent No.: US 11,766,970 B2
(45) Date of Patent: Sep. 26, 2023

(54) STORAGE BOX

(71) Applicant: TOYODA GOSEI CO., LTD., Kiyosu (JP)

(72) Inventor: Naoyuki Fukui, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 581 days.

(21) Appl. No.: 17/048,145

(22) PCT Filed: Apr. 16, 2019

(86) PCT No.: PCT/JP2019/016265
§ 371 (c)(1),
(2) Date: Oct. 16, 2020

(87) PCT Pub. No.: WO2019/203214
PCT Pub. Date: Oct. 24, 2019

(65) Prior Publication Data
US 2021/0146847 A1   May 20, 2021

(30) Foreign Application Priority Data
Apr. 17, 2018   (JP) .................. 2018-079242

(51) Int. Cl.
*B60R 7/04* (2006.01)
*B60R 11/00* (2006.01)
*B60N 3/12* (2006.01)

(52) U.S. Cl.
CPC ............. *B60R 7/04* (2013.01); *B60N 3/12* (2013.01); *B60R 2011/0007* (2013.01)

(58) Field of Classification Search
CPC ... B60R 7/04; B60R 2011/0007; B60N 2/753; B60N 2/763; B60N 2/767; B60N 2/77; B60N 2/773; B60N 2/793; B60N 3/12
See application file for complete search history.

(56) References Cited

U.S. PATENT DOCUMENTS 3,022,107 A * 2/1962 Daniels .................. B62D 25/12
                                                                49/260
5,067,625 A * 11/1991 Numata ................. A45C 11/24
                                                                220/230
(Continued)

FOREIGN PATENT DOCUMENTS

JP    4241532 B2    3/2009

OTHER PUBLICATIONS

International Search Report of the International Searching Authority dated Jun. 18, 2019 for the corresponding international application No. PCT/JP2019/016265 (and English translation).

*Primary Examiner* — Gregory A Blankenship
(74) *Attorney, Agent, or Firm* — POSZ LAW GROUP, PLC (57) ABSTRACT

The storage box includes: a box body having an opening toward a vehicle upper side; a fixed lid provided on a vehicle rear side of the opening; a movable lid provided on a vehicle front side of the opening; first shafts provided on a vehicle front side of the movable lid; a second shaft provided on a vehicle rear side of the movable lid; and a guide including first rails guiding the first shafts and second rails guiding the second shafts, to move the movable lid from a fully-closed position to a fully-opened position through a sliding operation and a turning operation. The second rails include slope portions guiding the second shaft so that the movable lid moves to an inner side of the box body relative to the fixed lid when the movable lid starts the sliding operation from the fully-closed position.

8 Claims, 6 Drawing Sheets

(56) References Cited

U.S. PATENT DOCUMENTS

| | | | | |
|---|---|---|---|---|
| 6,129,237 | A * | 10/2000 | Miyahara | G06F 1/1626 |
| | | | | 220/255 |
| 7,234,746 | B2 | 6/2007 | Sakakibara et al. | |
| 9,910,280 | B2 * | 3/2018 | Yomogita | G02B 27/0149 |
| 11,541,818 | B2 * | 1/2023 | Fukui | E05B 83/32 |
| 2004/0080173 | A1 * | 4/2004 | Niwa | B60N 2/773 |
| | | | | 296/1.09 |
| 2005/0248170 | A1 * | 11/2005 | Kawamoto | B60N 2/793 |
| | | | | 296/24.34 |
| 2006/0012202 | A1 | 1/2006 | Sakakibara et al. | |
| 2010/0050380 | A1 * | 3/2010 | Fujiwara | B60R 7/04 |
| | | | | 16/242 |
| 2011/0049157 | A1 * | 3/2011 | Nakamura | B60R 7/04 |
| | | | | 220/345.1 |
| 2015/0151656 | A1 * | 6/2015 | Bozio | B60N 2/773 |
| | | | | 296/24.34 |
| 2016/0304031 | A1 * | 10/2016 | Hipshier | B60R 7/04 |
| 2016/0355110 | A1 * | 12/2016 | Bozio | B60N 2/793 |
| 2018/0093601 | A1 * | 4/2018 | Sotelo | B60N 3/108 |
| 2018/0222394 | A1 * | 8/2018 | Huebner | B60R 7/04 |
| 2018/0236917 | A1 * | 8/2018 | Kim | B60N 2/753 |
| 2019/0084486 | A1 * | 3/2019 | Harmelink | E05B 85/107 |
| 2019/0135153 | A1 * | 5/2019 | Kim | B60R 7/04 |
| 2021/0146847 | A1 * | 5/2021 | Fukui | B60N 2/79 |
| 2022/0274530 | A1 * | 9/2022 | Thomas | B60N 2/793 |

* cited by examiner

STORAGE BOX

CROSS REFERENCE TO RELATED APPLICATIONS

This application is a U.S. national stage of International Patent Application No. PCT/JP2019/016265 filed on Apr. 16, 2019 and is based on Japanese Patent Application No. 2018-079242 filed on Apr. 17, 2018, the contents of which are incorporated herein by reference.

TECHNICAL FIELD

The present invention relates to a storage box used as a vehicle console box or the like.

BACKGROUND ART

Conventionally, as a storage box such as a console box, there is generally known a storage box that includes a box body having an opening which opens in the upward direction of the vehicle, and a lid body for opening/closing the opening of the box body. Patent Literature 1 discloses a storage box configured to allow a lid body to come into a fully-opened state through a sliding operation and a turning operation from a fully-closed state so that an opening of a box body is opened. In recent years, for a storage box as described above, there has been known a structure that allows a lid body to be stored inside a box body in order to improve the outer appearance when the lid body is fully opened.

CITATION LIST

Patent Literature

Patent Literature 1: JP4241532(B2)

SUMMARY OF INVENTION

Technical Problem

In a storage box of a type in which a lid body is stored inside a box body when the lid body is fully opened, the lid body becomes larger as the opening of the box body becomes larger, and therefore a larger lid body storage space is needed. As a result, there is such a disadvantage that, due to size increase of the lid body storage space, an item storage space in the box body needs to be reduced, or the size of the box body is increased, for example.

The present invention has been made in view of the above circumstances, and a problem to be solved by the present invention is to provide a storage box that enables a lid body to be stored compactly.

Solution to Problem

A storage box of the present invention made to solve the above problem includes: a box body having an opening toward a vehicle upper side; a lid body including a fixed lid provided on a vehicle rear side of the opening, and a movable lid provided on a vehicle front side of the opening; a support member including at least one first shaft provided on a vehicle front side of the movable lid, and a second shaft provided on a vehicle rear side of the movable lid; and a guide including at least one first rail configured to guide the at least one first shaft, and a second rail configured to guide the second shaft and provided so as to be separated from the at least one first rail in a vehicle front-rear direction, the guide being configured to move the movable lid from a fully-closed position to a fully-opened position through a sliding operation and a turning operation, wherein the at least one first rail includes a straight portion configured to guide the at least one first shaft to a vehicle rear side, and an arc portion configured to guide the at least one first shaft to a vehicle lower side, and the second rail includes a slope portion configured to guide the second shaft so that the movable lid moves to an inner side of the box body relative to the fixed lid when the movable lid starts the sliding operation from the fully-closed position, and a guide portion extending continuously from the slope portion and configured to guide the second shaft so that the movable lid moves to the fully-opened position.

Advantageous Effects of Invention

In the storage box of the present invention, the second rail includes the slope portion for guiding the second shaft so that the movable lid moves to the inner side of the box body relative to the fixed lid when the movable lid starts a sliding operation from the fully-closed position. Thus, by the slope portion of the second rail, the movable lid smoothly slides through the shortest distance from the fully-closed position to the inner side of the box body relative to the fixed lid, and the movable lid is compactly stored inside the box body. In addition, since the lid body is divided into the fixed lid and the movable lid, the size of the movable lid is reduced, whereby a storage space for the movable lid formed inside the box body is set to be compact.

DESCRIPTION OF EMBODIMENTS

Hereinafter, embodiments of a storage box according to the present invention will be specifically described with reference to FIG. 1 to FIG. 6. In the following description, directions such as front, rear, up, and down refer to front, rear, up, down shown in FIG. 2 and FIG. 4 to FIG. 6, and are directions as seen toward the vehicle advancing direction by an occupant of an automobile or the like. That is, front corresponds to the front side in the vehicle advancing direction and rear corresponds to the rear side in the vehicle advancing direction. In addition, the vehicle up-down direction refers to the up-down direction with respect to the vehicle advancing direction, and the vehicle left-right direction refers to the left-right direction with respect to the vehicle advancing direction. The front-rear direction of a movable lid 22 refers to the front-rear direction when the movable lid 22 is at a fully-closed position. In FIG. 2 and FIG. 4 to FIG. 6, hatching in the sectional views is partially omitted for the purpose of preventing the drawings from being unclear.

Embodiment 1

Figure 1:
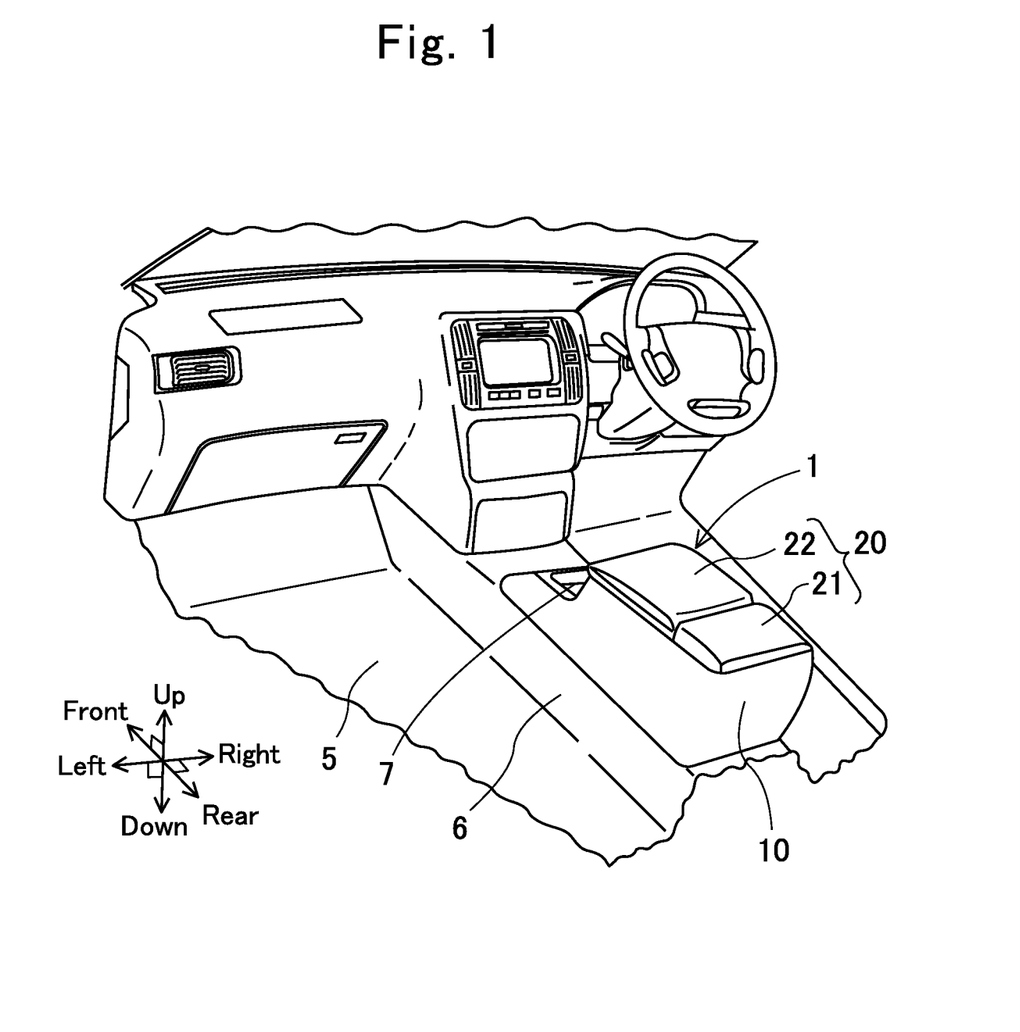
FIG. 1 is a perspective view around a console in a vehicle compartment.

As shown in FIG. 1, a console 6 standing on a floor panel 5 between a driver seat and a front passenger seat is provided from the front end to approximately the center part in a compartment of an automobile. The console 6 extends in the front-rear direction and is provided with a console box 1 as a storage box on the rear side of a tray 7 provided at the center part on the upper surface of the console 6.

Figure 2:
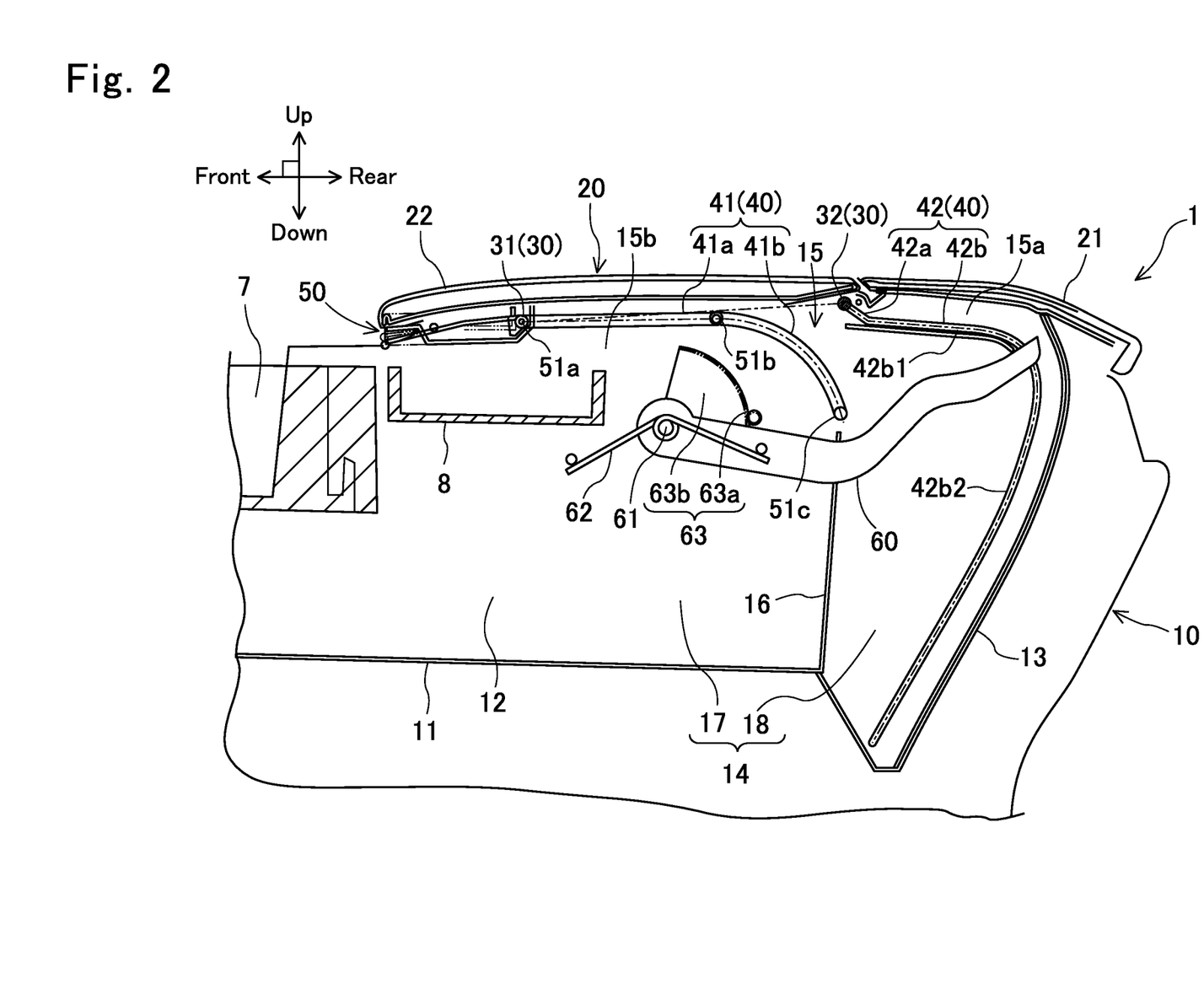
FIG. 2 is a partial sectional see-through side view showing a fully-closed state of a movable lid of a console box according to embodiment 1.

As shown in FIG. 2, the console box 1 according to the present embodiment includes a box body 10 having an opening 15, a lid body 20 having a fixed lid 21 and the movable lid 22, a support member 30 having a pair of first shafts 31 and a second shaft 32, a guide 40 having a pair of first rails 41 and a pair of second rails 42, a lock mechanism 50, a pair of arms 60, and second energizing members.

The box body 10 has an approximately rectangular box shape, and has a storage space 14 formed by being surrounded by a bottom wall 11, a front wall (not shown), a pair of side walls 12 (only the right side wall is shown), and a rear wall 13. The opening 15 is formed on the upper side of the storage space 14. A partition wall 16 extending in the left-right direction and the up-down direction is provided at a position shifted to the rear side from the center in the front-rear direction of the storage space 14. The storage space 14 is partitioned between the front side and the rear side by the partition wall 16, so that an item storage space 17 for storing items is formed on the front side and a lid storage space 18 for storing the movable lid 22 is formed on the rear side. In addition, the opening 15 of the storage space 14 is also divided into an opening 15b of the item storage space 17 and an opening 15a of the lid storage space 18 by the partition wall 16.

The size and the shape of the lid storage space 18 are determined as appropriate in accordance with a movement trajectory when the movable lid 22 moves from a fully-closed position to a fully-opened position through a sliding operation and a turning operation. In the present embodiment, the length in the front-rear direction of the opening 15a of the lid storage space 18 is set to be smaller than the length in the front-rear direction of the opening 15b of the item storage space 17. The depth of the lid storage space 18 is set in accordance with the length in the front-rear direction of the movable lid 22 to be stored, and is set to be greater than the depth of the item storage space 17. A small-item tray 8 is detachably provided on the front side of the opening 15b of the item storage space 17.

The lid body 20 includes the fixed lid 21 provided on the rear side of the opening 15 and the movable lid 22 provided on the front side of the opening 15 at a fully-closed position described later. The fixed lid 21 is formed in a quadrangular plate shape, and is fixed to the box body 10 at a position where the entirety of the opening 15a of the lid storage space 18 is closed. A gap large enough for the movable lid 22 to pass therethrough when the movable lid 22 moves is formed between the front end of the fixed lid 21 and the upper end of the partition wall 16. The movable lid 22 is formed in a quadrangular plate shape longer in the front-rear direction than the fixed lid 21, and is provided at a position where the entirety of the opening 15b of the item storage space 17 is closed. The fixed lid 21 and the movable lid 22 are provided in a state of being arranged close to each other in the front-rear direction on approximately the same plane.

Figure 3:
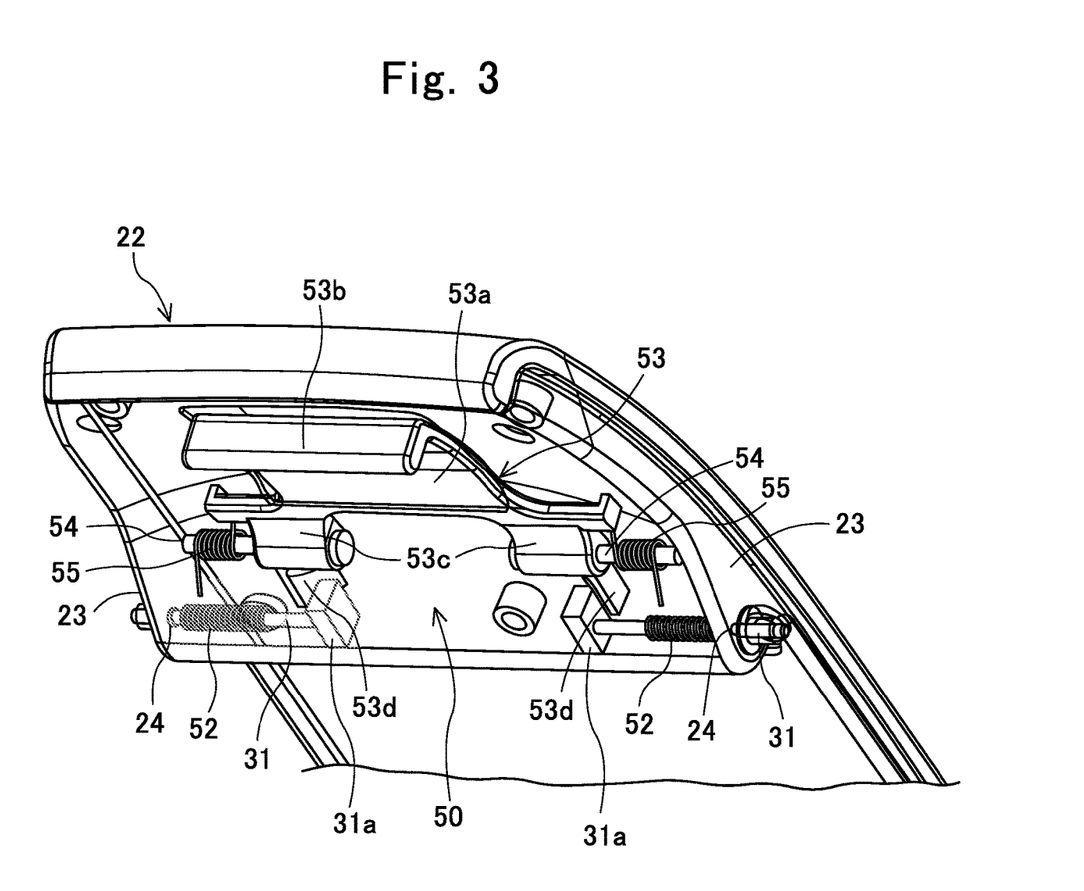
FIG. 3 is a perspective view showing a lock mechanism provided to the movable lid of the console box according to embodiment 1.

The movable lid 22 is supported by the support member 30 guided by the guide 40, and is provided so as to be movable while sliding and turning between a fully-closed position (see FIG. 2) where the entirety of the opening 15b of the item storage space 17 is closed and a fully-opened position (see FIG. 5) where the entirety of the opening 15b of the item storage space 17 is opened. As shown in FIG. 3, a pair of side plates 23 extending downward are provided at both left and right ends on the front side of the movable lid 22. A through hole 24 penetrating in the left-right direction (plate thickness direction) is provided at a rear end of each side plate 23. A pair of left and right through holes 24 are formed coaxially.

The support member 30 includes the pair of first shafts 31 provided on the front side of the movable lid 22 and the second shaft 32 provided on the rear side of the movable lid 22. The pair of first shafts 31 are each formed as a cylindrical shaft member, and are fitted into the pair of through holes 24 provided in the side plates 23 of the movable lid 22, so as to be independently movable in the left-right direction. Each first shaft 31 is constantly energized outward in the left-right direction by a first energizing member 52 (see FIG. 3) of the lock mechanism 50. Thus, ends of the first shafts 31 protrude outward in the left-right direction from the side plates 23 and are slidably fitted into the respective first rails 41. The pair of first shafts 31 are provided coaxially at a position shifted from the front end toward the rear end of the movable lid 22 by about ¼ of the entire length in the front-rear direction.

The provided position of the first shaft 31 is set as appropriate in a range from the front end to the center in the front-rear direction of the movable lid 22. In this case, as the provided position of the first shaft 31 becomes closer to the center in the front-rear direction of the movable lid 22, the movable lid 22 becomes less likely to interfere with an item stored in the item storage space 17 when the movable lid 22 performs a sliding operation and a turning operation. Thus, the substantial capacity of the item storage space 17 is set to be greater.

The second shaft 32 is formed by one cylindrical shaft member and is fixed to the inner surface at the rear end of the movable lid 22. The second shaft 32 is provided such that both ends thereof protrude outward in the left-right direction from both left and right ends of the movable lid 22 and are slidably fitted into the second rails 42. The second shaft 32 is provided in parallel with the pair of first shafts 31 so as to be separated therefrom in the front-rear direction. The provided position of the second shaft 32 is set as appropriate in consideration of a trajectory of a sliding operation and a turning operation of the movable lid 22. In this case, as the provided position of the second shaft 32 becomes closer to the rear end of the movable lid 22, the volume of the lid storage space 18 is set to be smaller.

The guide 40 is for moving the movable lid 22 supported by the first and second shafts 31, 32, from the fully-closed position to the fully-opened position through a sliding operation and a turning operation. The guide 40 includes the pair of first rails 41 for guiding the first shafts 31 and the pair of second rails 42 for guiding the second shaft 32. The pair of first rails 41 are formed in the same shape by long grooves extending in the front-rear direction on the pair of side walls 12 of the box body 10. The groove width of each first rail 41 is set at a predetermined width greater than the diameter of the first shaft 31 so that the first shaft 31 fitted into the first rail 41 is slidable.

Each first rail 41 includes a straight portion 41a extending in an approximately horizontal direction and guiding the first shaft 31 rearward from the start end on the front side, and an arc portion 41b extending in an arc shape continuously from the finish end of the straight portion 41a and guiding the first shaft 31 downward. The straight portion 41a is configured to guide the first shaft 31 when the movable lid 22 mainly performs a sliding operation, and the arc portion 41b is configured to guide the first shaft 31 when the movable lid 22 mainly performs a turning operation. The curvature of the arc portion 41b is set as appropriate in consideration of a trajectory of a turning operation of the first shaft 31 provided on the front side of the movable lid 22.

The pair of second rails 42 are formed in the same shape by long grooves extending in the front-rear direction and the up-down direction on the pair of side walls 12 of the box body 10, and are provided so as to be separated from the pair of first rails 41 in the front-rear direction. The groove width of each second rail 42 is set at a predetermined width greater than the diameter of the second shaft 32 so that the second shaft 32 fitted into the second rail 42 is slidable. Each second rail 42 includes a slope portion 42a downwardly sloped from the start end on the front side toward the rear side, and a guide portion 42b extending continuously from the finish end of the slope portion 42a. The slope portion 42a is for guiding the movable lid 22 toward the inner side (lower side) of the box body 10 relative to the fixed lid 21 when the movable lid 22 starts a sliding operation from the fully-closed position.

The guide portion 42b includes a straight portion 42b1 extending in an approximately horizontal direction continuously from the finish end of the slope portion 42a and guiding the second shaft 32 rearward, and a curved portion 42b2 extending in an arc shape continuously from the finish end of the straight portion 42b1 and guiding the second shaft 32 downward. The straight portion 42b1 is configured to guide the second shaft 32 when the movable lid 22 mainly performs a sliding operation, and the curved portion 42b2 is configured to guide the second shaft 32 when the movable lid 22 mainly performs a turning operation.

The curved portion 42b2 extends to the vicinity of the bottom wall 11 of the lid storage space 18. The curved portion 42b2 is formed in a shape obtained by combining a plurality of arcs different in curvature. In this case, most part from the upper part to the center part of the curved portion 42b2 is formed in a shape obtained by combining arcs of which the curvature centers are positioned on the front side of the curved portion 42b2. On the other hand, the lower part of the curved portion 42b2 is formed in a shape obtained by combining arcs of which the curvature centers are positioned on the rear side of the curved portion 42b2. The curved portion 42b2 may be changed as appropriate in consideration of a trajectory of a turning operation of the movable lid 22.

The lock mechanism 50 is a mechanism for bringing the movable lid 22 into a locked state at each of a fully-closed position, a half-opened position, and a fully-opened position. In the present embodiment, the fully-closed position is a position where the movable lid 22 closes the entirety of the opening 15b of the item storage space 17. The half-opened position is a position where the movable lid 22 opens approximately half the opening 15b of the item storage space 17. The fully-opened position is a position where the movable lid 22 opens the entirety of the opening 15b of the item storage space 17. As shown in FIG. 2 to FIG. 5, the lock mechanism 50 includes three pairs of first to third lock holes 51a, 51b, 51c, a pair of first energizing members 52, a release lever 53, support pins 54, and torsion springs 55.

The first to third lock holes 51a, 51b, 51c are provided as pairs at three locations in the pair of first rails 41 so as to correspond to the fully-closed position (see FIG. 2), the half-opened position (see FIG. 4), and the fully-opened position (see FIG. 5) of the movable lid 22. That is, the pair of first lock holes 51a are provided at the start ends on the front sides of the straight portions 41a, the pair of second lock holes 51b are provided near the finish ends on the rear sides of the straight portions 41a, and the pair of third lock holes 51c are provided at the finish ends on the lower side of the arc portions 41b.

As shown in FIG. 3, the pair of first energizing members are formed by coil springs mounted coaxially to the outer circumferential surfaces of the respective first shafts 31, and are provided so as to constantly energize the respective first shafts 31 outward in the left-right direction. Thus, when the movable lid 22 reaches the fully-closed position, the first shafts 31 slidably fitted into the first rails 41 and the first lock holes 51a are respectively fitted to each other, thereby coming into a locked state. In addition, when the movable lid 22 reaches the half-opened position, the first shafts 31 and the second lock holes 51b are respectively fitted to each other, thereby coming into a locked state. In addition, when the movable lid 22 reaches the fully-opened position, the first shafts 31 and the third lock holes 51c are respectively fitted to each other, thereby coming into a locked state.

The release lever 53 includes a plate-shaped base portion 53a, an operation portion 53b formed at an end of the base portion 53a, and a pair of leg portions 53c formed at another end of the base portion 53a. The release lever 53 is provided such that the leg portions 53c are mounted pivotably between the front-rear direction and the up-down direction, to the pair of support pins 54 fixed to the side plates 23 of the movable lid 22 in parallel with the first shafts 31. Sloped pressing portions 53d for pressing, inward in the left-right direction, pressed portions 31a provided at inner ends in the left-right direction of the first shafts 31, are provided at ends of the respective leg portions 53c. The torsion springs 55 for constantly making energization in a direction in which the sloped pressing portions 53d provided at the ends of the leg portions 53c are separated from the pressed portions 31a of the first shafts 31, are mounted to the outer circumferential surfaces of the support pins 54.

The release lever 53 is configured such that, when the operation portion 53b is operated, the leg portions 53c are pivoted between the front-rear direction and the up-down direction against the energization forces of the torsion springs 55. At this time, the sloped pressing portions 53d at the ends of the leg portions 53c respectively press the pressed portions 31a of the first shafts 31 against the energization forces of the first energizing members 52, to move the first shafts 31 inward in the left-right directions. The lock mechanism 50 is configured to release the locked state between the first shafts 31 and the first to third lock holes 51a, 51b, 51c by an operation of the release lever 53 as described above.

The pair of arms 60 are provided pivotably mainly in the up-down direction at predetermined positions on the outer side surfaces of both side walls 12 of the box body 10. The proximal ends of the arms 60 are pivotably supported by a pair of pivot shafts 61 provided at both side walls 12. On the other hand, the distal ends of the arms 60 are located so as to come into contact with the movable lid 22 or the second shaft 32 provided to the movable lid 22, and thus support the movable lid 22 from the lower side. The pair of pivot shafts 61 are provided coaxially, and extend in parallel with the pair of first shafts 31 and the second shaft 32. The pair of arms 60 are movable irrespective of movement of the movable lid 22 because the pivot shafts 61 are located at positions different from the first and second shafts 31, 32 and are not linked therewith.

Each pivot shaft 61 is provided with a torsion spring as the second energizing member 62 for energizing the arm 60 in a direction in which the movable lid 22 moves from the fully-opened position to the fully-closed position. Each second energizing member 62 is provided such that the energization force thereof is minimized (energy is released) when the end of the arm 60 supporting the movable lid 22 or the second shaft 32 provided to the movable lid 22 is stopped at the half-opened position of the movable lid 22. Thus, as the movable lid 22 approaches the fully-opened position from the half-opened position, the energization force is accumulated in each second energizing member 62.

Each arm 60 is only required to push the movable lid 22 back to the half-opened position from the fully-opened position, and a stopper may be provided for preventing the arm 60 from being pivoted toward the front side of the vehicle beyond the half-opened position. In the case of providing the stopper, in an opening operation of the movable lid 22, the movable lid 22 or the second shaft 32 provided to the movable lid 22 comes into contact with the arm 60 at a time when the movable lid 22 is opened to the half-opened position, and then the arm 60 supports the movable lid 22 from the lower side while the movable lid 22 is opened from the half-opened position to the fully-opened position. During this period, the energization force is accumulated in the second energizing member 62, and when the movable lid 22 reaches the fully-opened position, the first shaft 31 and the third lock hole 51c are fitted to each other, thereby coming into a locked state, and the energization force is kept. On the other hand, in a closing operation of the movable lid 22, the arm 60 pushes the movable lid 22 back to the half-opened position from the fully-opened position, and then the pivoting operation of the arm 60 is restricted by the stopper at the half-opened position. Thereafter, when the movable lid 22 is moved from the half-opened position to the fully-closed position, the arm 60 is separated from the movable lid 22 and the movable lid 22 is closed through an operation by an operator.

The pair of arms 60 are each provided with a damper device for reducing the pivoting speed of the arm 60 against the energization force of the second energizing member 62. Each damper device 63 includes an oil damper 63a provided at a predetermined position on the outer side surface of each of both side walls 12 of the box body 10, and a sector gear 63b formed in a sector shape and having, on an outer peripheral part thereof, external teeth meshed with the oil damper 63a so that the sector gear 63b is pivotable integrally with the arm 60. Each oil damper 63a is a known one configured to reduce the rotational force of the external gear by the viscous resistance of oil sealed between a shaft part and the external gear, and is provided in parallel with the pivot shaft 61 so as to be separated therefrom by a predetermined distance. Each sector gear 63b is supported by the pivot shaft 61 at the arc center part of the sector shape, and is provided so as to be pivotable integrally with the arm 60 while being meshed with the oil damper 63a.

When the end of each arm 60 is pivoted from the fully-opened position toward the half-opened position of the movable lid 22 by the energization force accumulated in the second energizing member 62, the damper device 63 reduces the pivoting speed of the arm 60 against the energization force of the second energizing member 62 by the viscous resistance generated due to rotation of the oil damper 63a meshed with the sector gear 63b. Thus, the pivoting speed of each arm 60 is appropriately reduced, whereby impact sound when the arm 60 is stopped is reduced.

Next, operations when the opening 15b of the item storage space 17 is opened and closed by the movable lid 22 in the console box 1 of the present embodiment configured as described above will be described.

First, an opening operation of the movable lid 22 on the box body 10 will be described. As shown in FIG. 2, when the movable lid 22 is in a fully-closed state, the ends of the first shafts 31 fitted into the first rails 41 are fitted to the first lock holes 51a, thereby establishing a locked state in which the movable lid 22 is not moved. From this state, an operator such as a passenger manually operates the release lever 53, thereby releasing the locked state between the first shafts 31 and the first lock holes 51a. That is, when the operation portion 53b of the release lever 53 is operated, the leg portions 53c are pivoted between the front-rear direction and the up-down direction against the energization forces of the torsion springs 55 so that the ends of the leg portions 53c move in a direction away from the inner surface of the movable lid 22. Thus, the sloped pressing portions 53d at the ends of the leg portions 53c respectively press the pressed portions 31a of the first shafts 31 inward in the left-right direction against the energization forces of the first energizing members 52 so as to move the first shafts 31, whereby the locked state between the first shafts 31 and the first lock holes 51a is released.

In this state, while the operator is sliding the movable lid 22 by pushing the movable lid 22 rearward, the operator takes the fingers off the operation portion 53b of the release lever 53. Thus, the first shafts 31 fitted into the first rails 41 slide rearward through the straight portions 41a, and the second shaft fitted into the second rails 42 slides rearward through the slope portions 42a and the straight portions 42b1. At this time, when the movable lid 22 starts a sliding operation, the second shaft 32 first slides through the slope portions 42a, whereby the rear end of the movable lid 22 is guided to the inner side of the box body 10 (the lower surface side of the fixed lid 21).

Figure 4:
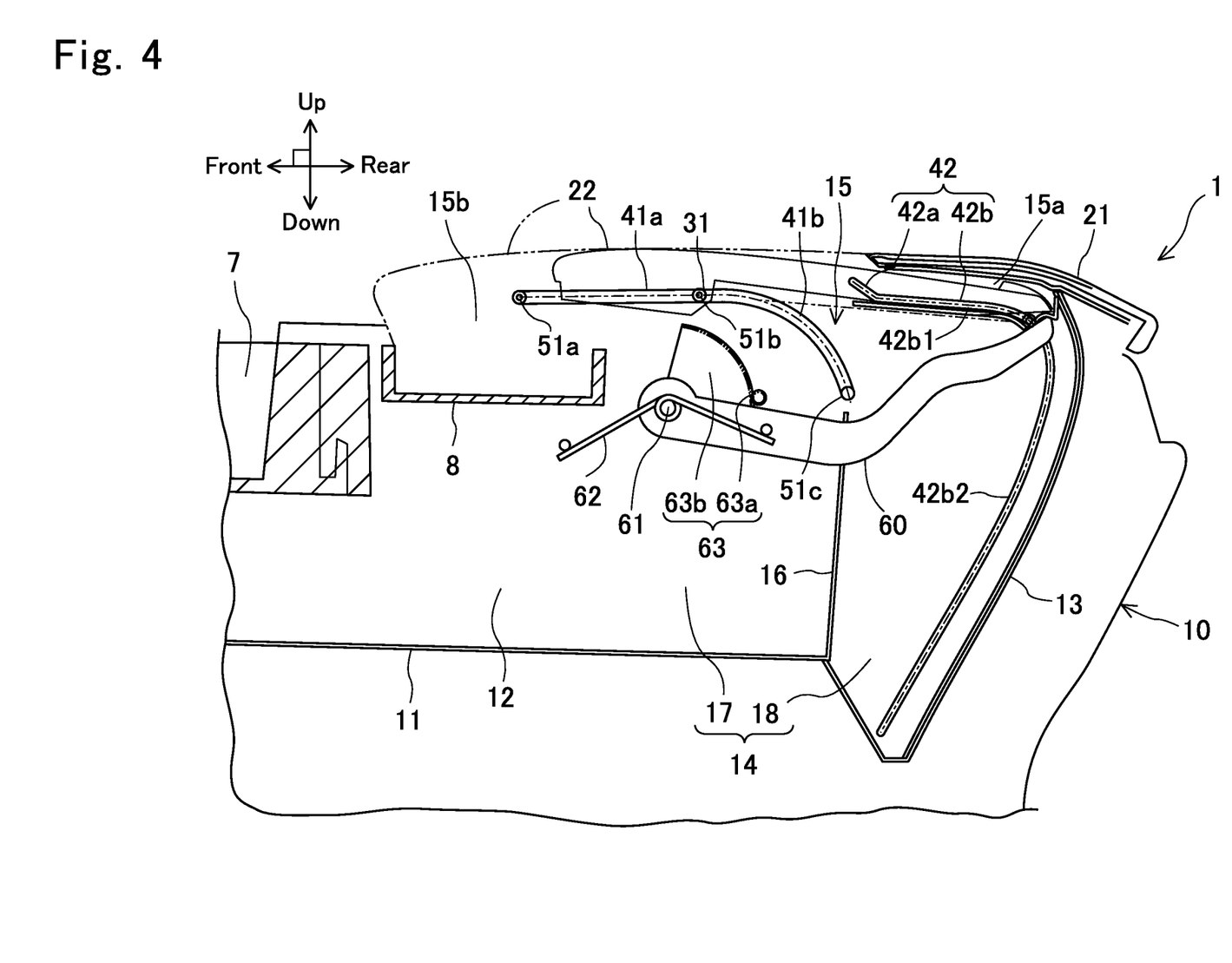
FIG. 4 is a partial sectional see-through side view showing a half-opened state of the movable lid of the console box according to embodiment 1.

Thereafter, the second shaft 32 slides rearward through the straight portions 42b1 extending continuously from the finish ends of the slope portions 42a, and then, as shown in FIG. 4, the movable lid 22 is stopped by being locked at a position in a half-opened state. At this time, the ends of the first shafts 31 are fitted to the second lock holes 51b, thereby coming into a locked state. In addition, since the movable lid 22 slides rearward, the rear end of the movable lid 22 moves into the lower surface side of the fixed lid 21 so as to become approximately parallel with the fixed lid 21, and is stopped at a position where the front end of the movable lid 22 does not protrude above the fixed lid 21. Thus, approximately the front half of the opening 15b of the item storage space 17 is opened so that the upper side of the small-item tray 8 is opened, thereby allowing an item to be taken out from or put in the small-item tray 8.

Figure 5:
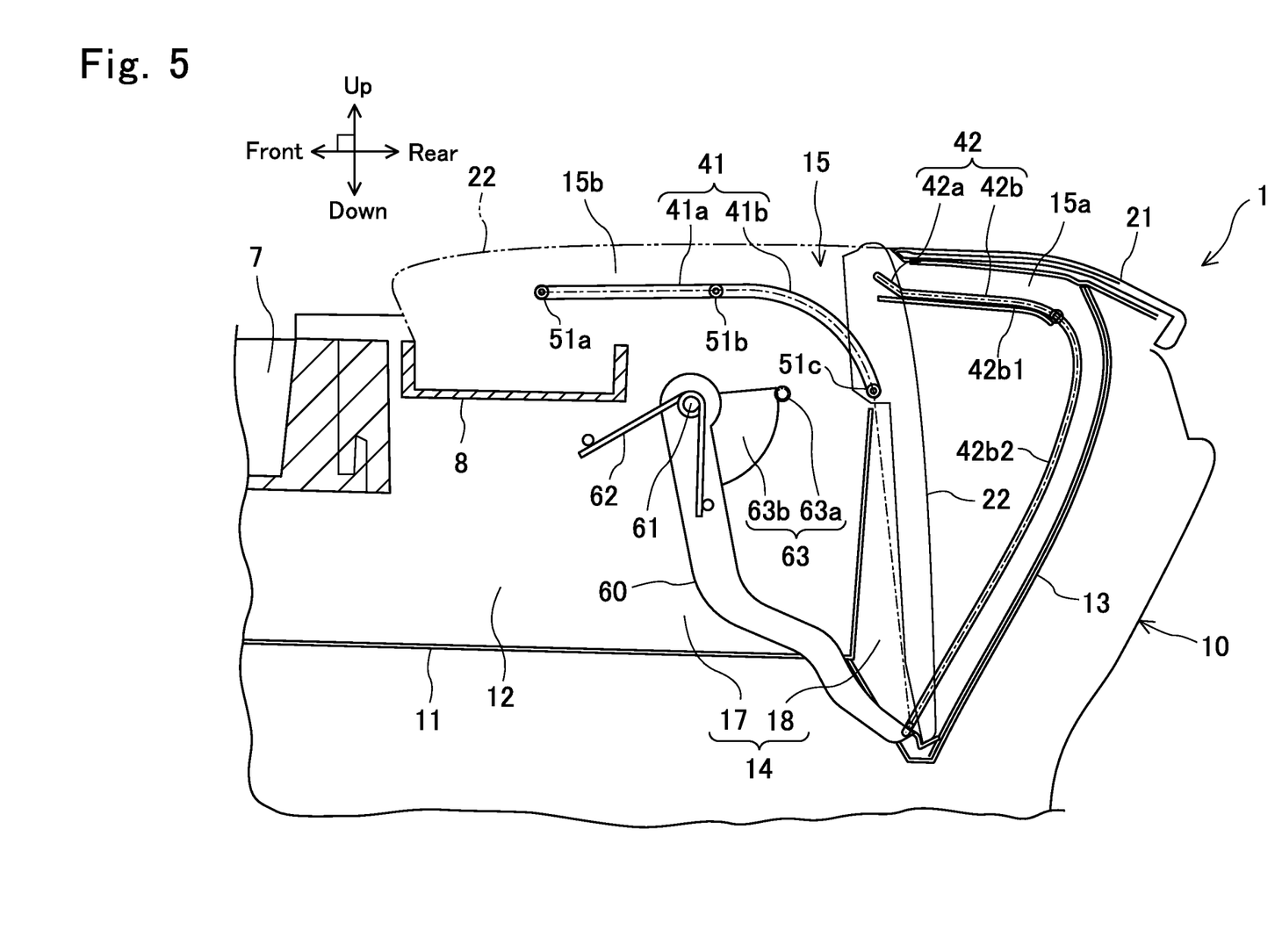
FIG. 5 is a partial sectional see-through side view showing a fully-opened state of the movable lid of the console box according to embodiment 1.

Subsequently, in the case of desiring to bring the opening 15b of the item storage space 17 into a fully-opened state, the operator manually operates the release lever 53 in the same manner as described above, thereby releasing the locked state between the first shafts 31 and the second lock holes 51b. Thereafter, the movable lid 22 is pushed rearward and downward, whereby the movable lid 22 is moved to be turned. Thus, the first shafts 31 fitted into the first rails 41 slide rearward and downward through the arc portions 41b extending continuously from the finish ends of the straight portions 41a, and the second shaft 32 fitted into the second rails 42 slides downward through the curved portions 42b2 extending continuously from the finish ends of the straight portions 42b1. Thus, the movable lid 22 is moved to be turned, so that, as shown in FIG. 5, the movable lid 22 is stopped by being locked at a position in a fully opened state. At this time, the ends of the first shafts 31 are fitted to the third lock holes 51c, thereby coming into a locked state. Thus, approximately the entirety of the opening 15b of the item storage space 17 is opened, thereby allowing an item to be taken out from or put in the item storage space 17.

In addition, when the second shaft 32 slides downward through the curved portions 42b2, the ends of the arms 60 supporting the lower side of the second shaft 32 are pushed downward, whereby the ends of the arms 60 are pivoted downward about the pivot shafts 61 against the energization forces of the second energizing members 62. At this time, as the second shaft 32 sliding downward through the curved portions 42b2 of the second rails 42 approaches the fully-opened position of the movable lid 22, the energization forces are accumulated in the second energizing members 62.

Next, a closing operation of the movable lid 22 on the box body 10 (operation for returning the movable lid 22 from the fully-opened position to the fully-closed position) will be described. In the case of closing the opening 15b of the item storage space 17 from the state in which the movable lid 22 is at the fully-opened position as shown in FIG. 5, the operator manually operates the release lever 53 in the same manner as described above, to release the locked state between the first shafts 31 and the third lock holes 51c. Thus, the ends of the arms 60 are pivoted upward about the pivot shafts 61 by the energization forces accumulated in the second energizing members 62. At this time, the sector gears 63b of the damper devices 63 are rotated integrally with the arms 60 while being meshed with the oil dampers 63a. Thus, the pivoting speeds of the arms 60 are reduced against the energization forces of the second energizing members 62 by the viscous resistances generated in the oil dampers 63a, whereby the pivoting speeds of the arms 60 are appropriately reduced and impact sound when the arms 60 are stopped is reduced.

In addition, when the arms 60 are pivoted upward by the energization forces of the second energizing members 62, the second shaft 32 fitted into the second rails 42 slides upward through the curved portions 42b2 of the guide portions 42b, and the first shafts 31 fitted into the first rails 41 slide frontward and upward through the arc portions 41b. Thus, the movable lid 22 is moved to be turned and the movable lid 22 is stopped by being locked at a position in a half-opened state (see FIG. 4). At this time, the ends of the first shafts 31 are fitted to the second lock holes 51b, thereby coming into a locked state, so that, as in the above description, an item is allowed to be taken out from or put in the small-item tray 8.

In the case of further closing the opening 15b of the item storage space 17 from the above state, the operator manually operates the release lever 53 in the same manner as described above, thereby releasing the locked state between the first shafts 31 and the second lock holes 51b. Then, while the operator is sliding the movable lid 22 by drawing the movable lid 22 frontward, the operator takes the fingers off the operation portion 53b of the release lever 53. Thus, the first shafts 31 fitted into the first rails 41 slide frontward through the straight portions 41a, and the second shaft 32 fitted into the second rails 42 slides frontward through the straight portions 42b1 and the slope portions 42a.

Then, when the first shafts 31 reach the start ends (left ends) of the straight portions 41a, the movable lid 22 is stopped by being locked at a position in a fully-closed state. At this time, the ends of the first shafts 31 are fitted to the first lock holes 51a, thereby coming into a locked state. In addition, the second shaft 32 passes through the slope portions 42a from the straight portions 42b1, to reach the start ends (left ends) of the slope portions 42a. Thus, the movable lid 22 and the fixed lid 21 are arranged in the front-rear direction approximately on the same plane, and the opening 15b of the item storage space 17 comes into a fully-closed state.

In the console box 1 of the present embodiment configured as described above, the second rails 42 include the slope portions 42a for guiding the second shaft 32 so that the movable lid 22 moves to the inner side of the box body 10 relative to the fixed lid 21 when the movable lid 22 starts a sliding operation from the fully-closed position. Thus, by the slope portions 42a of the second rails 42, the movable lid 22 smoothly slides through the shortest distance from the fully-closed position to the inner side of the box body 10 relative to the fixed lid 21, and the movable lid 22 is compactly stored inside the box body 10.

Since the lid body 20 of the present embodiment is divided into the fixed lid 21 and the movable lid 22, the size of the movable lid 22 is reduced, whereby a storage space for the movable lid 22 (lid storage space 18) formed inside the box body 10 is set to be compact.

The first rail 41 includes the straight portion 41a for guiding the first shaft 31 to the rear side of the vehicle, and the arc portion 41b for guiding the first shaft 31 to the lower side of the vehicle. Therefore, the movement trajectory of the first shaft 31 which is provided on the front side of the movable lid 22 and slides through the first rail 41 is optimally set, whereby the front-side movement trajectory of the movable lid 22 which performs a sliding movement and a turning movement is optimally set. Thus, the capacity of the item storage space 17 is increased.

The second rail 42 includes the guide portion 42b which extends continuously from the slope portion 42a and guides the second shaft 32 to the fully-opened position of the movable lid 22. Therefore, the movement trajectory of the second shaft 32 which is provided on the rear side of the movable lid 22 and slides through the second rail 42 is optimally set, whereby the rear-side movement trajectory of the movable lid 22 which performs a sliding movement and a turning movement is optimally set. Thus, the capacity of the item storage space 17 is increased. In particular, since the guide portion 42b of the present embodiment is formed in a shape obtained by combining a straight shape and a plurality of arcs different in curvature, optimization of the rear-side movement trajectory of the movable lid 22, and further, increase of the capacity of the item storage space 17, are easily achieved.

The console box 1 of the present embodiment includes the lock mechanism 50 for bringing the movable lid 22 into a locked state at the half-opened position, thereby allowing the movable lid 22 to be brought into a locked state at a position where only the upper side of the small-item tray 8 is opened. Therefore, in the case where an item is to be taken out from or put in only the small-item tray 8, the opening 15b of the item storage space 17 does not need to be entirely opened, and thus an item is quickly taken out from or put in the small-item tray 8. Further, since the lock mechanism 50 for bringing the movable lid 22 into a locked state at the half-opened position is formed by the pair of first shafts 31, the pair of second lock holes 51b, the pair of first energizing members 52, the release lever 53, and the like, the lock mechanism is realized with a simple structure.

The console box 1 of the present embodiment includes the pair of arms 60 for pushing the movable lid 22 back to the fully-closed position from the fully-opened position, whereby a closing operation of the movable lid 22 is stably and easily performed. In addition, the console box 1 of the present embodiment includes the second energizing members 62 for energizing the arms 60 from the fully-opened position to the fully-closed position of the movable lid 22. Therefore, the movable lid 22 is automatically returned from the fully-opened position to the half-opened position using the energization forces of the second energizing members 62, whereby a closing operation of the movable lid 22 is performed more advantageously and easily. Further, the console box 1 of the present embodiment includes the damper devices 63 for reducing the pivoting speeds of the arms 60. Therefore, when the arms 60 are pivoted by the energization forces of the second energizing members 62, the pivoting speeds of the arms 60 are appropriately reduced, whereby impact sound when the arms 60 are stopped is reduced.

Embodiment 2

Figure 6:
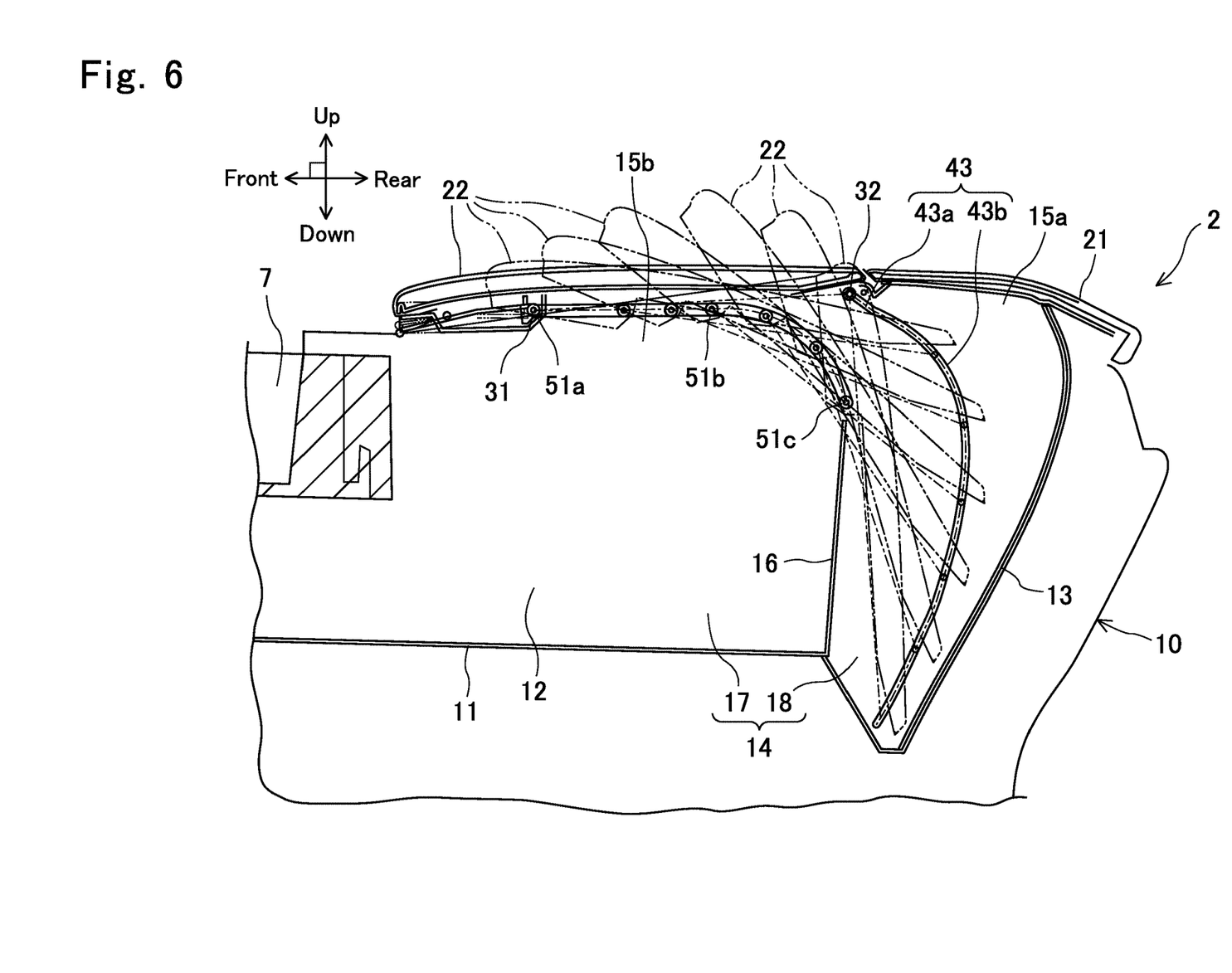
FIG. 6 is a partial sectional see-through side view showing an opening/closing operation of a movable lid of a console box according to embodiment 2.

As shown in FIG. 6, in a console box 2 according to embodiment 2, only the shapes of a pair of second rails 43 of the guide 40 are different from those in embodiment 1, while the other configurations are the same as those in embodiment 1. Therefore, the detailed description of members and configurations that are the same as in embodiment 1 are omitted, and different points and important points will be described below. The same members as in embodiment 1 are denoted by the same reference characters. FIG. 6 shows an opening/closing operation of the movable lid 22 moving while being guided by the first and second rails 41, 43, and the small-item tray 8, the lock mechanism 50, the arms 60, and the like are not shown.

The pair of second rails 43 of embodiment 2 each include a slope portion 43a downwardly sloped from the start end on the front side to the rear side, and a guide portion 43b extending continuously from the finish end of the slope portion 43a, and the guide portion 43b is different from that of embodiment 1. The guide portion 43b of embodiment 2 does not have the straight portion 42b1 shown in embodiment 1, but is formed in a shape obtained by combining only a plurality of arcs different in curvature.

In this case, the guide portion 43b is formed so as to be gradually reduced in curvature as becoming away from the finish end of the slope portion 43a. In addition, the guide portion 43b is formed in a shape obtained by combining only arcs of which the curvature centers are positioned on the front side of the guide portion 43b. Therefore, due to absence of the straight portion at the first half part (upper half part) of the guide portion 43b, the first half part of the guide portion 43b is in a state of being shifted to the front side. In addition, the distance by which the second shaft 32 sliding through the guide portion 43b moves from the fully-closed position to the fully-opened position of the movable lid 22 is shorter than in the case of embodiment 1.

In the console box 2 of embodiment 2 configured as described above, an operator such as a passenger performs an opening/closing operation of the movable lid 22 in the same manner as in embodiment 1. In the case of embodiment 2, the movable lid 22 supported by the first shafts 31 sliding through the first rails 41 and the second shaft 32 sliding through the second rails 43 performs a sliding movement and a turning movement to exhibit a movement trajectory as shown in FIG. 6. At this time, the second shaft 32 sliding through the second rails 43 moves through the shortest route from the fully-closed position to the fully-opened position of the movable lid 22 because the guide portions 43b are shorter than those in embodiment 1.

The first to third lock holes 51a, 51b, 51c of the lock mechanism 50 are provided in the same manner as in embodiment 1, so that the movable lid 22 is locked at each of the fully-closed position (see FIG. 2), the half-opened position (see FIG. 4), and the fully-opened position (see FIG. 5). Therefore, as in embodiment 1, the movable lid 22 is stored in the lid storage space 18 in a state of being locked at the fully-opened position.

The console box 2 of embodiment 2 configured as described above provides the same effects as the console box 1 of embodiment 1. Further, in the console box 2 of embodiment 2, since the guide portion 43b of each second rail 43 is formed in a shape obtained by combining only a plurality of arcs different in curvature, the first half part of the guide portion 43b is shifted to the front side. Therefore, owing to the shifting to the front side, the rear wall 13 of the box body 10 is shifted to the front side, whereby the length in the front-rear direction of the box body 10 is shortened. In addition, the volume of the lid storage space 18 is reduced, whereby the movable lid 22 is stored more compactly. In addition, since the guide portion 43b of each second rail 43 is shorter than that of embodiment 1, the movable lid 22 is moved through the shortest route from the fully-closed position to the fully-opened position, whereby an opening/closing operation of the movable lid 22 is quickly performed.

Other Embodiments

The present invention is not limited to the embodiments described above, and various changes may be made without departing from the gist of the present invention.

For example, the first rail 41 and the second rail 42, 43 in the above embodiments are formed by long grooves extending on the side wall 12, but in the case where the side wall 12 is formed by a thin panel or the like, the first rail 41 and the second rail 42, 43 may be formed by providing slit-like elongated holes penetrating the panel or the like in the thickness direction.

The slope portion 42a, 43a of the second rail 42, 43 in the above embodiments are formed in a straight shape. However, the slope portion 42a, 43a may be formed in a shape obtained by combining a straight shape and a plurality of arcs different in curvature, as in the curved portion 42b2 or the guide portion 43b.

In the above embodiments, the lock mechanism 50 for locking the movable lid 22 at the fully-opened position is configured to make the locking by the first shafts 31 and the third lock holes 51c fitting to each other. Instead, a heart cam mechanism or the like of conventionally known technology may be adopted.

In the above embodiments, the second energizing members 62 are provided for energizing the pair of arms 60 from the fully-opened position to the fully-closed position of the movable lid 22. However, power of an electric device or the like may be used instead of the energization forces of the second energizing members 62.

DESCRIPTION OF THE REFERENCE CHARACTERS 1, 2 console box
10 box body
15 opening
20 lid body
21 fixed lid
22 movable lid
30 support member
31 first shaft
32 second shaft
40 guide
41 first rail
41a straight portion
41b arc portion
42, 43 second rail
42a, 43a slope portion
42b, 43b guide portion
50 lock mechanism
51 lock hole
52 first energizing member
53 release lever
60 arm
62 second energizing member
63 damper device

The invention claimed is:

1. A storage box comprising:
 a box body having an opening toward a vehicle upper side;
 a lid body including a fixed lid provided on a vehicle rear side of the opening, and a movable lid provided on a vehicle front side of the opening;
 a support member including at least one first shaft provided on a vehicle front side of the movable lid, and a second shaft provided on a vehicle rear side of the movable lid; and
 a guide including at least one first rail configured to guide the at least one first shaft, and a second rail configured to guide the second shaft, the guide being configured to move the movable lid from a fully-closed position to a fully-opened position through a sliding operation and a turning operation, wherein
 the at least one first rail includes a straight portion configured to guide the at least one first shaft to a vehicle rear side, and an arc portion configured to guide the at least one first shaft to a vehicle lower side, and
 the second rail includes a slope portion configured to guide the second shaft so that the movable lid moves to an inner side of the box body relative to the fixed lid when the movable lid starts the sliding operation from the fully-closed position, and a guide portion extending continuously from the slope portion and configured to guide the second shaft so that the movable lid moves to the fully-opened position.

2. The storage box according to claim 1, wherein
 the slope portion is formed in a straight shape, and the guide portion is formed in a shape obtained by combining a straight shape and a plurality of arcs different in curvature.

3. The storage box according to claim 1, wherein
 the slope portion is formed in a straight shape, and the guide portion is formed in a shape obtained by combining a plurality of arcs different in curvature.

4. The storage box according to claim 1, further comprising a lock mechanism configured to bring the movable lid into a locked state at a half-opened position.

5. The storage box according to claim 4, wherein
 the first shafts are provided as a pair so as to be movable in a vehicle left-right direction, and
 the lock mechanism includes a pair of lock holes provided in the first rails so as to correspond to the half-opened position of the movable lid, a pair of first energizing members respectively energizing the pair of first shafts outward in the vehicle left-right direction, and a release lever configured to release a locked state between the pair of first shafts and the lock holes against energization forces of the first energizing members.

6. The storage box according to claim 1, further comprising an arm having a proximal end pivotably supported and a distal end provided so as to come into contact with the movable lid or the second shaft provided to the movable lid, wherein
 the arm is configured to push the movable lid back to the fully-closed position from the fully-opened position.

7. The storage box according to claim 6, further comprising a second energizing member energizing the arm from the fully-opened position toward the fully-closed position of the movable lid.

8. The storage box according to claim 7, further comprising a damper device configured to reduce a pivoting speed of the arm.

* * * * *